May 8, 1923.
H. MacINNES
1,454,323
METHOD OF AND APPARATUS FOR MAKING FLEXIBLE ROOFING MATERIAL
Filed Nov. 21, 1921
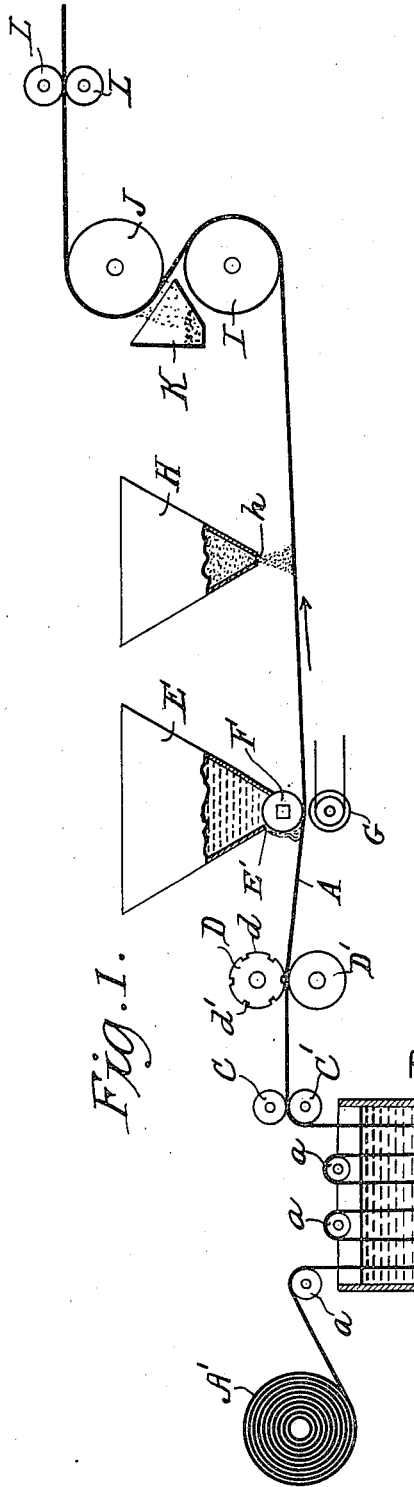
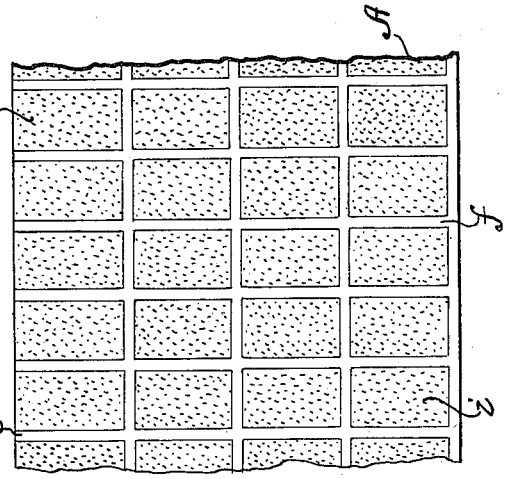
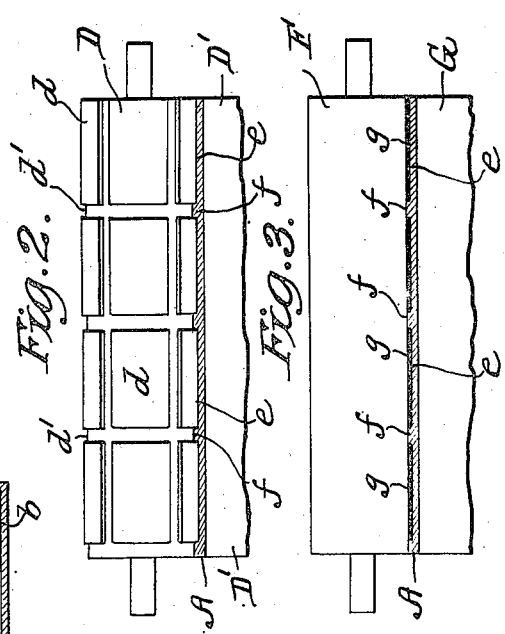
INVENTOR
Hugh MacInnes
BY
N. J. Benhold
ATTORNEY Patented May 8, 1923.

1,454,323

UNITED STATES PATENT OFFICE.

HUGH MacINNES, OF JERSEY CITY, NEW JERSEY.

METHOD OF AND APPARATUS FOR MAKING FLEXIBLE ROOFING MATERIAL.

Application filed November 21, 1921. Serial No. 516,566.

*To all whom it may concern:*

Be it known that I, HUGH MacINNES, a citizen of the United States, residing at Jersey City, county of Hudson, and State of New Jersey, have invented a certain new and useful Method of and Apparatus for Making Flexible Roofing Material, of which the following is a specification.

This invention pertains to the art of making flexible roofing material in sheet or web form whereby it may be wound or coiled in rolls for storage and transportation.

The object is to produce on the surface of a waterproofed web or sheet a pattern or design adapted to be coated in selected areas with mineral material in granular form, and to perform the required operations in a certain sequence with a view to the rapid and economical production of the material.

In this art it is desirable to impart to the exposed surface of the roofing material a pattern or design which simulates tiles or shingles having the appearance of a tesselated effect, and to apply the granular material in a manner to retain the same permanently upon the surface so that it is not dislodged upon exposure to atmospheric and weather conditions.

I have found that a web of fibrous material and impregnated with a waterproof substance can, while in a heated condition, be formed with a pattern in the exposed surface by the aid of pressure, such pattern surface being characterized by certain raised areas in relief and with intermediate areas in intaglio, i. e. depressed below the plane of the areas in relief, such areas in intaglio being due to compression of the fibrous material. Subsequently to the formation of the pattern with areas in intaglio and other areas in relief upon the surface of the web, a coating of suitable material is applied to the areas in intaglio only of the pattern surface, such applied coating being in a heated condition and while hot remaining in a viscous state, but the application of the coating takes place only in the depressed or intaglio areas, none being applied to the raised pattern lines. While the coating is in such viscous condition, granular material is fed to the web so as to spread over the surface of the sheet, and this results in the adhesion of the granular material to the viscous coating within the intaglio areas, said granular material not adhering to the areas in relief of the pattern surface, and being free to drop off the web, for the reason that none of the coating material is applied to said areas in relief. The web in a more or less heated condition, and with the coated and granular covered surfaces, now passes to compression rolls and to the cooling drums, whereby the granular material is forcibly embeded by the compression rolls into the coating and the heat of the web and the coating is dissipated by the cooling drums, with a view to the subsequent operation of winding the treated material in a roll.

In the drawings—

Figure 1 is a view diagrammatic in form and with parts in sectional elevation.

Figure 2 is a view in side elevation of the pattern roll, illustrating the action of said roll upon a web of compressible material so as to produce a pattern surface, with areas in intaglio and in relief.

Figure 3 is a side elevation of a scraping roll illustrating the action of applying a coating material to the intaglio areas of the pattern surface, and Figure 4 is a plan view of the roofing material with a pattern surface as produced by my mode of procedure.

Means for impregnating the dry web of material, A, such as felt usual in the art, are shown in Figure 1 as a tank B with which is associated direction rolls $a$ $b$, it being usual to employ appropriate heating means, such as steam coils (not shown) in connection with said tank. The flexible felt in a dry condition is contained in a roll A', supported or mounted for free rotation in a suitable manner, and this web is moved at a desired speed within and through the machine by suitable means.

The tank B is charged with a suitable waterproofing material, or compound of materials, it being preferred to use the bituminous or asphaltum agents common in the art, and the web A is conducted by the rolls within the bath for a desired number of times with a view to saturating or impregnating said web with said waterproofing material.

From the tank, the web in a saturated and heated condition, passes between heated rolls C C' and is directed thereby to and between the co-operating rolls D D', one of which, D, is a pattern roll, shown more particularly in Figure 2, said rolls C C' and D D', being suitably mounted and being driven by appropriate means.

The pattern roll is formed on its surface with raised areas $d$, leaving grooves or depressions $d'$, as shown in Figure 2, the raised areas $d$ and depressions $d'$ constituting the pattern surface on said roll. Of course, the design formed by the pattern surface on the roll will be changed according to the ornamentation to be given to the weather surface of the material.

The roll D' has a smooth surface, and it is positioned below and in the vertical plane of the roll, for supporting the web of material when the latter is compressed in definite areas by the raised surfaces $d$ of said pattern roll to produce the depressions $e$ constituting the intaglio areas in the pattern of the web, said depressed and compressed areas $e$ of the intaglio surfaces being bounded and defined by raised surfaces $f$ appearing in relief upon the surface of the web, and which areas in relief are free from the pressure of the pattern roll D, the fibrous material of the web entering the grooves $d'$ of said surface on the pattern roll.

The next step in the procedure consists in the application of a coating to the intaglio areas only of the pattern surface on the fibrous web, said coating being free from application to the areas in relief of said surface of the web. To this end I have shown a tank E and a roll F acting as a distributing and scraping roll. Said tank is positioned above the path of the web, and is provided with an outlet E' for the material, within which outlet is positioned the scraping roll F. The material used for coating the web in the intaglio areas thereof is preferably asphaltum of a harder nature than the asphaltum used in tank B for impregnating said web, and as usual this coating material is heated so as to keep the same in a plastic condition suitable for application to the web, the roll F operating to distribute said plastic material in a layer of uniform thickness and within the numerous intaglio areas of the web, as indicated at $g$ in Figure 3.

At the stage of applying the plastic coating composed usually of relatively hard asphaltum, the fibrous material of web A is under longitudinal tension, more or less. This is brought about by so arranging the roll F that its bottom surface is somewhat below the path of movement of the fibrous web, and said roll thus contacts with the web so as to depress said web out of a straight line extending between the pass of rolls D D' and cooling drum I. Said roll F thus acts to deflect the web so as to place tension thereon. The roll F is a stationary roll, being held from rotation with respect to the hopper and to the web, and in service said roll F performs the function of a scraper or knife, whereby the relatively hard or oxygenized asphaltum runs freely and by gravity out of the tank E and is distributed or spread over the surface of the web by the pressure or tension of said web against the surface of the stationary roll F. From actual experience I find that the operation of feeding hard asphaltum coating material upon a moving sheet and into contact with a stationary roll, such asphaltum coating material is deposited within the depressions constituting the intaglio areas, said stationary roll acting as a distributing element and as a scraper for removing the coating material from the areas in relief upon the web.

G is a second roll positioned below the scraper roll F and at a point below the path of the web. This roll may be used in case it is desired to apply a coating to the smooth rear surface of the web, which is not usual, but when so used to apply a coating to the rear surface of the web, the roll G is positively driven, it is positioned for contact with the web, and means (not shown) are used for feeding coating material to said roll for application to the web.

The web having been treated to produce thereon a pattern with areas in relief and other areas in intaglio, and said web having been coated within the areas in intaglio with a coating material of a viscous self-hardening character, said web moves to means for feeding granular material upon the top surface of the web. Said feed means is shown as a hopper H, the outlet of which is close to the path of the web. The granular material is spread over the whole surface of the web, but such material adheres only to the coatings present within the intaglio areas of the embossed surface, and said granular material being free from adhesion to the areas in relief because no coating is present upon said areas in relief. The granular material which may lodge upon the web within the areas in relief thereof is free to drop off the web when the latter is bent around drum J so that the loose granular material drops into the receptacle K.

I J are cooling drums over which the prepared web passes and by which the web is bent or folded so that the surplus non-adhering granular material is free to drop by gravity into a collecting receptacle K, the latter being adjacent drum J.

L L are co-operating pressure rolls between which the treated web passes so as to subject the granular material to pressure with a view to embedding said granular material into the coated material within the intaglio areas as well as to level the pattern surface of the web.

The product is illustrated in Figure 4, wherein the web is indicated at A, the surface in relief at f, and the granular coated areas at i, the granular material being embedded in the layers of the coating material present in the intaglio areas e, which layers g and intaglio areas e are shown by the cross sectional view of the fibrous web A in Figure 3.

The article produced by the method herein disclosed is made the basis of a separate application filed December 27, 1922, Serial No. 609,199.

Having thus fully described the invention, what I claim as new and desire to secure by Letters Patent is:

1. In the art of making flexible roofing material with a design in the exposed surface thereof, the process which consists in subjecting a web of fibrous material to pressure to produce definite areas in intaglio and other areas in relief on one surface of said web, covering the areas in intaglio with a coating material, and feeding granular material to the coated areas of the web whereby said granular material is united by adhesion to the coating material present in the intaglio surfaces of the web.

2. In the art of making flexible roofing material with a design in the exposed surface thereof, the process which consists in subjecting a web of fibrous material to pressure to produce definite areas in intaglio and other areas in relief on one surface of said web, covering the intaglio areas with coatings of viscous self-hardening material, while leaving the relief surfaces of the web free from said coating material, feeding granular material to the pattern surface of the web whereby said granular material unites with the coating material present in the intaglio areas, and subjecting the web to pressure for embedding the granular material within the coatings present within the intaglio areas of the pattern upon the surface of the web.

3. In the art of making flexible roofing material with a design in the exposed surface thereof, the process which consists in subjecting a web of fibrous material to pressure in definite areas to produce certain areas in intaglio and other areas in relief, covering the areas in intaglio with a coating material while leaving the areas in relief free from said coating material, applying granular material to the surface of the web whereby said granular material unites with the coating within the intaglio areas, discharging the surplus free granular material deposited upon the web, and compressing the web to embed the granular material within the coating material present in the intaglio areas of said web.

4. In the art of making flexible roofing material with a design in the exposed surface thereof, the process which consists in imparting movement to a web of fibrous material, impregnating said web with a heated waterproofing agent, subjecting the web while in a heated condition to pressure within definite areas to produce in one face of the web a pattern certain areas of which are in intaglio and other areas in relief, covering the areas in intaglio with a coating material, feeding granular material into contact with that surface of the web having the pattern, and subjecting the web to pressure for leveling the granular material and embedding the same within the coating material present within the intaglio areas of the pattern surface.

5. In an apparatus for making flexible roofing material with a design on the exposed surface thereof, the combination with means for saturating a web of fibrous material with a heated waterproofing material, of co-operating rolls one of which is a smooth faced roll and the other is a pattern roll operating to compress said fibrous material within definite areas and to produce thereon a pattern surface certain areas of which are in intaglio and other areas in relief, means for covering the areas in intaglio with a coating material, and means for feeding granular material to the coating material present in the intaglio areas of said pattern surface on the web.

6. In an apparatus for making flexible roofing material with a design on the exposed surface thereof, the combination with means for saturating a web of fibrous material with a heated waterproofing material, of cooperating rolls one of which is a pattern roll operating to compress said fibrous material within definite areas and to produce thereon a pattern surface certain areas of which are in intaglio and other areas in relief, a tank for coating material, means for imparting tension to said web and for feeding a coating material to the intaglio areas only of the pattern surface of the web, and means for feeding granular material to the coating material present in the intaglio areas of the pattern surface of the web.

7. In an apparatus for making flexible roofing material with a design on the exposed surface thereof, the combination with means for saturating a web of fibrous material with a heated waterproofing material, of cooperating rolls one of which is a pattern roll operating to compress said fibrous material within definite areas and to produce thereon a pattern surface certain areas of which are in intaglio and other areas in relief, means for covering the areas in intaglio with a coating material, means for feeding granular material to the coating material present in the intaglio areas of the pattern surface on the web, and co-operating pressure rolls for leveling the granular material and for embedding the same within the coatings present in the intaglio areas of the pattern surface of the web.

In testimony whereof I have hereto signed my name this 10th day of November, 1921.

HUGH MacINNES.